United States Patent [19]

Thomas

[11] 4,101,601
[45] Jul. 18, 1978

[54] EPOXY-CATALYST ADDITIVE SYSTEM TO PRODUCE HIGHER I.V. POLYBUTYLENE TEREPHTHALATE FROM LOW I.V. POLYMER

[75] Inventor: Norman W. Thomas, Warren, N.J.

[73] Assignee: Celanese Corporation, New York, N.Y.

[21] Appl. No.: 644,276

[22] Filed: Dec. 24, 1975

[51] Int. Cl.$^2$ ............................................. C08L 63/00
[52] U.S. Cl. ........................ 260/836; 260/830 P; 260/837 R
[58] Field of Search ............................ 260/835, 836

[56] References Cited

U.S. PATENT DOCUMENTS

| | | | |
|---|---|---|---|
| 3,198,850 | 8/1965 | Levantin | 260/836 |
| 3,312,654 | 4/1967 | Pratt | 260/33.4 |
| 3,330,814 | 7/1967 | Vasta | 260/88.1 |
| 3,377,406 | 4/1968 | Newey | 260/837 |
| 3,408,422 | 10/1968 | May | 260/837 |
| 3,420,914 | 1/1969 | May | 260/837 |
| 3,454,418 | 7/1969 | Forsberg | 117/75 |
| 3,547,873 | 12/1970 | Weissermel | 260/40 |
| 3,560,605 | 2/1971 | Siggel | 264/328 |
| 3,621,074 | 11/1971 | Siggel | 260/835 |
| 3,678,131 | 7/1972 | Klapprott | 260/837 R |
| 3,723,568 | 5/1973 | Hoeschele | 260/830 R |
| 3,886,104 | 5/1975 | Borman | 260/835 |
| 3,909,485 | 9/1975 | Hongo | 260/40 R |
| 3,943,187 | 3/1976 | Wu | 260/837 R |
| 4,020,122 | 1/1973 | Borman | 260/835 |

Primary Examiner—Paul Lieberman

[57] ABSTRACT

The present invention provides a process for preparing branched chain, thermoplastic polymers having improved melt strength and die swell properties. This process comprises reacting at least one thermoplastic polymer capable of reaction with an epoxy functionality, with at least one epoxy branching agent containing at least two epoxy groups per molecule of epoxy branching agent in the molten state, in the presence of a catalytic amount of at least one catalyst. The catalyst may be selected from the group consisting of alkyl triphenyl phosphonium halide and alkenyl triphenyl phosphonium halide wherein the alkyl groups contain from one to ten carbon atoms, the alkenyl groups contain from two to six carbon atoms, and the halide anion is selected from the group consisting of chloride and bromide.

The molten, thermoplastic, branched chain polymer reaction product has increased melt strength and intrinsic viscosity. When polyesters or polymers containing carboxylic acid functional groups are reacted with the epoxy branching agent, the improved polymers have a decreased number of carboxylic acid end groups. The increased melt strength polymers also have improved die swell characteristics and are useful in extrusion applications such as blow molding.

13 Claims, No Drawings

EPOXY-CATALYST ADDITIVE SYSTEM TO PRODUCE HIGHER I.V. POLYBUTYLENE TEREPHTHALATE FROM LOW I.V. POLYMER

BACKGROUND OF THE INVENTION

In blow molding processes, molten resin must form into stable parisons for a time long enough to permit a mold to enclose the parison. If these molten resins do not possess sufficient "melt strength" or melt viscosity, the parisons will tend to elongate or draw under their own weight and either not be blow moldable or result in blow molded articles which have non-uniform wall thicknesses, low surface gloss, poorly defined sample shape, and a large number of pitmarks.

Polymers such as polyesters, polyamides, polyethers, and polyamines when melted generally form thin liquids having low melt viscosities and poor melt strengths. These low melt viscosity materials are unsuited or are only poorly suited for the manufacture of extruded shapes, tubes, deep-drawn articles, and large blow molded articles. In order to overcome this disadvantage and to convert these polymers to a form better suited for the above-mentioned manufacturing techniques it is known to add compounds to the plastics which will increase their melt viscosities. The materials which are added to increase the melt viscosity of the plastics are generally cross linking agents, as described, for example, in U.S. Pat. No. 3,378,532. Such cross linking agents may be added during the condensation reaction by which the plastics are formed, and/or to the plastics after their formation (prior to, or during their melting). Examples of cross linking agents which may be added to the plastics after their formation and before or after their melting in order to increase the melt viscosity include compounds containing at least two epoxy or isocyanate groups in the molecule, organic phosphorus compounds, peroxides, bishaloalkylaryl compounds, and polyesters of carbonic acid.

These known cross linking agents which are added to increase the melt viscosity of the polymer are not completely satisfactory. They may, for instance, cause an excessively rapid and large increase in viscosity or form reaction products which have an adverse influence on the quality of the plastics. Furthermore, the results obtained with the use of these known cross linking agents are not always uniform or reproducible. For example, when polyesters of carbonic acid are used to increase the melt viscosity, the degree of viscosity increase is generally dependent not only upon the amount of additive used but also upon its molecular weight and on the stage of the polycondensation reaction at which the addition takes place.

Besides having sufficient melt viscosity or "melt strength", polymers which are to be used in blow molding and related applications should also possess sufficient die swell, i.e., the molten polymer should expand as it is released from the extrusion die. This die swell is important for blow molding applications since (a) the larger the diameter of the extruded polymer, the easier it is for air to be blown into the parison, and (b) the greater the die swell the greater the expansion of the molten polymer to fit the particular mold.

Polyesters having low intrinsic viscosities are particularly difficult to blow mold. The prior art illustrates the use of numerous additives to modify various properties of polyesters. For example, U.S. Pat. No. 3,376,272 discloses a process for the preparation of branched chain, high molecular weight thermoplastic polyesters having a multiplicity of linear non-cross linked polyester branched chains from dicarboxylic acid anhydrides, monoepoxides, and an alcohol compound by reacting these compounds at a temperature below 150° C. However, the polyesters described in this patent are formed from anhydrides and are therefore not crystalline. Non-crystalline polymers tend to take longer time to set up in a mold and thus are not suited or are only poorly suited for blow molding and related applications.

As indicated above, compounds containing epoxy groups in the molecule have been used to increase the melt viscosity of polyesters (see, for example, U.S. Pat. No. 2,830,031). But although the use of epoxies as cross linking agents for polyesters is known, little appears known about the use of epoxies as reactants which promote the branching (and hence increase the "melt strength") but not the cross linking of polyesters.

U.S. Pat. No. 3,547,873 discloses the production of thermoplastic molding compositions from linear saturated polyesters and polyfunctional epoxides. This process, however, also yields products which lack the melt strength and die swell necessary for blow molding applications.

Furthermore, U.S. Pat. No. 3,692,744 discloses the preparation of polyester molding materials which can be injection molded by having present in the polyesterification mixture, besides the terephthalic acid and diol components, 0.05–3 moles percent, on the acid component, of a compound containing at least three ester forming groups such as a polycarboxylic acid, a polyhydric alcohol, or a hydroxy carboxylic acid. The use of epoxy compounds is not disclosed, however.

Copending United States patent application Ser. No. 669,066, which was filed on Mar. 22, 1976 and which is also assigned to the assignee of the present invention, generically discloses and claims a process for preparing branched chain thermoplastic polymers having increased melt strength and which are useful in extrusion applications. Said copending application is entitled "Improved Polymers for Extrusion Applications" and is filed in the name of John R. Costanza and Frank M. Berardinelli. This process comprises reacting at least one thermoplastic polymer which is in the molten state with at least one branching agent which may be selected from the group consisting of epoxy having a functionality of at least two and isocyanate having a functionality of at least three. Branched chain, high melt strength thermoplastic polymers useful in extrusion applications are obtained from this process.

In the above described process, reaction between the thermoplastic polymer and the isocyanate branching agent is sufficiently rapid that catalysts are not necessary. However, the reaction between the thermoplastic polymer and the epoxy branching agent requires the use of a catalyst. Typical acid acceptor type catalysts such as diethylamine tend to rapidly produce the improved melt strength polymer products, but these products, while acceptable for many uses, in some instances tend to be rather brittle and somewhat colored.

OBJECTS AND SUMMARY OF THE INVENTION

Accordingly, a general object of the present invention is to avoid or substantially alleviate the above problems of the prior art.

A more specific object of the present invention is to provide a process for preparing improved polymer compositions having improved melt strength and die swell characteristics.

Another object of the present invention is to provide a process for preparing improved polymer compositions useful in extrusion applications.

A further object of the present invention is to provide a process for preparing substantially non-brittle polymer compositions with improved color characteristics.

Still another object of the present invention is to provide the improved polymer compositions prepared by these processes.

It is also an object of the present invention to provide an improved polymer extrusion process utilizing these new polymers.

Other objects and advantages of the invention will become apparent from the following summary and description of the preferred embodiments of the present invention.

In one aspect, the present invention provides a process for preparing branched chain thermoplastic polymers having increased melt strength which are useful in extrusion applications. This process comprises reacting at least one thermoplastic polymer which is in the molten state and which is capable of reaction with an epoxy functionality, with at least one epoxy branching agent containing at least two epoxy groups per molecule of epoxy branching agent, in the presence of a catalytic amount of at least one catalyst selected from the group consisting of alkyl triphenyl phosphonium halide and alkenyl triphenyl phosphonium halide wherein the alkyl groups contain from one to ten carbon atoms, the alkenyl groups contain from two to six carbon atoms, and the halide anion is selected from the group consisting of chloride and bromide.

In another aspect, the present invention provides the melt strength improved thermoplastic polymers produced by this process.

In still another aspect, there is provided an improved molding process which comprises forming a melt of the above-described melt strength improved thermoplastic polymer into a desired article and cooling the molten polymer.

The essence of the present invention is the discovery that when thermoplastic polymers in a molten state are reacted with the particularly defined epoxy branching agents as described above in the presence of a catalytic amount of the catalyst described above, the molten thermoplastic polymer product not only possesses increased melt strength but the final polymer product also is both substantially colorless and less brittle than an epoxy modified thermoplastic polymer produced in processes employing other catalysts, such as amine catalysts.

Although the theoretical mechanism is not clear and I do not wish to be bound by any theoretical explanation, it appears that when typical amine catalysts such as diethylamine are used to catalyze the reaction between the thermoplastic polymer and the epoxy branching agent, adduct formation may take place between the epoxy and the amine catalyst. This appears likely since relatively high ratios of amine catalyst to epoxy are required. The brittleness of the amine catalyst final product may be associated with the existence of a polyblend structure.

It is believed that no such adduct formation takes place between the epoxy branching agent and the catalysts useful in the present invention.

The polymers prepared according to the process of the present invention also have improved die swell characteristics, i.e., after extrusion of the molten polymer through an orifice having a particular diameter, the diameter of the extruded polymer may increase up to about two or three times the diameter of the extrusion orifice.

DESCRIPTION OF THE PREFERRED EMBODIMENTS

As indicated hereinabove, the process of the present invention comprises reacting molten polymer with an epoxy branching agent in the presence of a catalytic amount of catalyst to form an improved polymer having increased melt strength.

Any thermoplastic polymer which contains functional groups capable of reacting with the epoxy branching agent may be used in the process of the present invention. Such functional groups include carboxyl, amine, hydroxyl, epoxy, and isocyanate groups. Thermoplastic polymers include polyesters, polyamides, and allyl alcohol/styrene copolymers. Saturated thermoplastic polyesters are preferred.

The term "thermoplastic" polymer is meant to include all polymers which soften when exposed to sufficient heat and which return to their original condition when cooled to room temperature.

Thermoplastic polyesters are preferred polymers for use in the present process. Saturated thermoplastic polyesters are particularly preferred and include saturated aliphatic/aromatic polyesters and wholly aromatic polyesters. The term "saturated" polyester is meant to include all polyesters which do not contain ethylenic unsaturation in the polymer chain. The saturated, thermoplastic polyesters may be halogenated, i.e., contain halogen (e.g., bromine and/or chlorine) substitution in the polyester chain. The use of halogenated polyesters is particularly desirable when products having decreased flammability are desired.

The saturated thermoplastic polyesters useful in the present invention may be formed in a multitude of ways well known to those skilled in this art. These saturated thermoplastic polyesters may be prepared from dihydric alcohols and dicarboxylic acids or the dialkyl esters of dicarboxylic acids wherein the alkyl groups may contain from one to seven carbon atoms.

Typical dihydric alcohols include aromatic dihydric alcohols such as bisphenol A [i.e., 2,2-bis(4-hydroxyphenyl) propane], phenolphthalein, 4,4'-sulfonyl diphenol, resorcinol, hydroquinone, catechol, naphthalene diols, stilbene bisphenol, 4,4'-diphenylether diphenol, and mixtures thereof and aliphatic dihydric alcohols such as saturated dihydric alcohols having from 2 to 4 carbon atoms and mixtures thereof.

Halogenated dihydric alcohols may also be employed. Such halogenated dihydric alcohols include, for example, tetrabromobisphenol A, tetrachlorobisphenol A, 2,2'-[isopropylidenebis(2,6-dichloro-p-phenylene)], and 2,2-bis[3,5-dibromo-4-(2-hydroxyethoxy)phenyl]-propane.

Typical aromatic carboxylic acids include, for example, phthalic acid (including isophthalic and terephthalic), hydroxybenzoic acid, and mixtures thereof.

Typical polyesters useful herein include the linear polyesters of an aromatic dicarboxylic acid reacted with a saturated aliphatic or cycloaliphatic diol, particularly polyethylene terephthalate, polypropylene terephthalate, polybutylene terephthalate, poly-1,3-cyclobutane terephthalate, polypentylene terephthalate, polycyclohexane-1,4-dimethylol terephthalate, poly-1,5-pentane diol terephthalate, and polyneopentylglycol terephthalate.

Typical wholly aromatic thermoplastic polyesters include the reaction product of bisphenol A, isophthalic or terephthalic acids or mixtures (50/50 or 60/40 mole %) of isophthalic and terephthalic acids. Such polyesters may additionally contain minor amounts of a saturated aliphatic dihydric alcohol having from 2 to 4 carbon atoms. Halogenated wholly aromatic thermoplastic polyesters include, for example, the reaction product of tetrabromobisphenol A, and a 50-50 mole ratio of isophthalic and terephthalic acid (and optionally, a minor amount of ethylene glycol).

Polypropylene terephthalate, polybutylene terephthalate, and mixtures thereof as well as mixtures of polyethylene terephthalate and polybutylene terephthalate are particularly preferred polyesters.

In the process of the present invention, the thermoplastic polymer is reacted with an epoxy branching agent containing at least two epoxy groups per molecule of epoxy branching agent in the presence of a particularly defined catalyst whereby high melt strength, substantially non-cross linked thermoplastic polymers are formed.

Epoxy branching agents useful in the present invention include epoxy molecules having two or more epoxy groups per epoxy molecule. Thus, di-, tri-, or more highly substituted epoxies may be used. Halogenated epoxies (i.e., those substituted with e.g., bromine and/or chlorine) may also be used, especially when flame retardant properties are desired. Mixtures of two or more epoxies may be used as well as epoxies containing minor (i.e., less than about 25% by weight) amounts of impurities as long as the impurities do not affect the reaction between the thermoplastic polymer and the epoxy.

The epoxy resins utilized in the present invention are most commonly prepared by the condensation of bisphenol A (4,4'-isopropylidene diphenol) and epichlorohydrin. Also, other polyols, such as aliphatic glycols and novolac resins may be reacted with epichlorohydrin for the production of epoxy resins suitable for use in the instant process provided resinous products are selected which possess the requisite flow properties.

In a preferred embodiment of the invention epoxy resins are selected which possess terminal epoxide groups and are condensation products of bisphenol A and epichlorohydrin of the following formula:

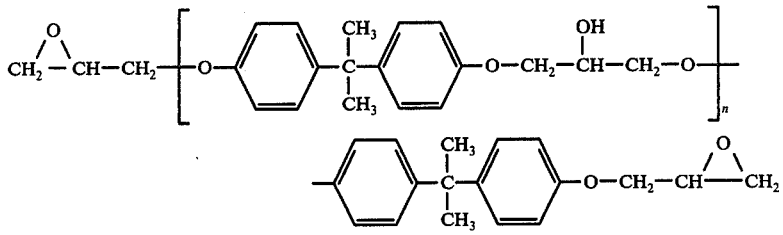

where $n$ varies between zero and a small number less than about 10. When $n$ is zero, the resin is a very fluid light-colored material which is essentially the diglycidyl ether of bisphenol A. As the molecular weight increases, the viscosity of the resins also generally increases. Accordingly, the particularly preferred liquid epoxy resins generally possess an $n$ value averaging less than about 1.0. Epoxy novolacs, as well as epoxy cycloaliphatics may also be selected. Illustrative examples by standard trade designations of particularly useful commercially available epoxy resins include: Epi-Rez 508, Epi-Rez 510, Epi-Rez 520, Epi-Rez 530, Epi-Rez 540, Epi-Rez 550, and Epi-Rez 5155 (Celanese Coatings Company); DER 332, and DEN 438 (Dow Chemical Company); Epon 828, and Epon 1031 (Shell Chemical Company); and ERLA 2256 (Union Carbide). Other epoxies useful in the present process include cyclohexane diepoxide, cyclopentane diepoxide, and butane diol diglycidyl ether.

A particularly preferred epoxy is the diglycidyl ether of bisphenol A.

The amounts of thermoplastic polymer and epoxy branching agent used in the present invention may vary widely, although generally from about 97.5 to about 99.5, and preferably from about 98 to about 99% by weight polymer, and generally from about 0.5 to about 2.5, and preferably from about 1 to about 2% by weight of epoxy branching agent may be employed. The expressed percentages are by weight of the total reaction mixture (i.e., total weight of thermoplastic polymer, polyepoxy branching agent and catalyst).

Other additives, both polymeric and non-polymeric, such as flame retardants, lubricity agents, dyes, antioxidants, and inorganic fillers (such as glass) may be employed as long as these additives do not interfere with the reaction between the thermoplastic polymer and the epoxy branching agent. Such additives may generally be present in amounts up to about 10% by weight of the total reaction mixture.

The catalyst employed in the present invention may be selected from the group consisting of alkyl triphenyl phosphonium halide and alkenyl triphenyl phosphonium halide wherein the alkyl groups contain from one to ten carbon atoms, the alkenyl groups contain from two to six carbon atoms, and the halide anion is selected from the group consisting of chloride and bromide.

Alkyl triphenyl phosphonium halide and alkenyl triphenyl phosphonium halide are preferred catalysts. Allyl triphenyl phosphonium bromide and n-butyl triphenyl phosphonium bromide are particularly preferred.

The use of these compounds in catalytic amounts is advantageous in that the polymers produced in the process of the present invention are both the less brittle and less intensely colored than those produced using the same reactants and reaction conditions but using other catalysts such as amine catalysts.

The catalyst employed in the present invention may be used in catalytic amounts, i.e., generally from about 0.01 to about 0.1, and preferably from about 0.02 to about 0.06% by weight based upon the weight of the total reaction mixture.

The catalyst and epoxy branching agent may be present in a mole ratio of branching agent to catalyst of generally from about 10 to 1 to about 100 to 1, and preferably from about 20 to 1 to about 50 to 1.

The thermoplastic polymer, branching agent, and catalyst may be blended in any convenient manner as long as they are in contact for a period of time sufficient for chemical reaction to take place. Thus, the improved melt strength polymers of the present invention may be prepared by coating the thermoplastic polymer with a solution of the epoxy branching agent in a solvent in which the epoxy branching agent is soluble and the polymer is insoluble. The solvent should be substantially nonreactive toward the reactants or products of the reaction. Such solvents include hydrocarbons (such as methylene chloride) and ketones. The coated polymer may be allowed to air dry and then may be heated to the temperature at which reaction between the thermoplastic polymer and epoxy branching agent takes place.

The reactants may also be prepared by blending the epoxy branching agent and catalyst with solid polymer chip and then feeding this mixture to a melt screw extruder (such as a Werner-Pfleiderer ZSK twin screw extruder) which is at a temperature high enough to cause the polymer to melt and thus enable reaction between the thermoplastic polymer and epoxy branching agent to take place.

Alternatively, the thermoplastic polymer may be milled until fully molten in a plastograph (such as a C. W. Brabender Rolle type plastograph) at temperatures high enough to melt the polymer. When the polymer is in the molten state, the epoxy branching agent and catalyst may be introduced directly into the polymer until a melt viscosity of generally greater than about 1,000, typically greater than about 2,000, and preferably greater than about 6,000 poise is achieved.

In this specification, the term "melt viscosity" refers to the viscosity of the polymer in a molten or fused state. Melt viscosity is measured by dynamic viscosity evaluation in a rheometrics viscometer at 240° C. Such a measurement may be obtained by placing a sample in a rheometer and heating to 240° C. The melt viscosity may be obtained by plotting dynamic viscosity versus frequency.

The present process may be carried out at subatmospheric, atmospheric, or superatmospheric pressures, although substantially atmospheric pressure is preferred.

The present process may be carried out at any temperature which is such that the thermoplastic polymer will remain in the molten state for a period of time sufficient to enable reaction between the thermoplastic polymer and the epoxy branching agent to take place. However, the temperature should not be high enough to decompose the thermoplastic polymer. At atmospheric pressure, the reaction may be carried out at temperatures of generally from about 150 to about 350, typically from about 180 to about 300, and preferably from about 220 to about 280° C.

The reaction between the thermoplastic polymer and the epoxy branching agent may be conducted generally in any environment. However, because of the sensitivity of certain epoxy branching agents, catalysts, and polymers to the presence of water, the reaction is preferably carried out in the substantial absence of water. Sufficient quantities of water tend to destroy the activity of the catalysts as well as that of certain of the epoxy branching agents, and to degrade the polymers. It is also often desirable to conduct the reaction in the substantial absence of oxygen gas. Thus, the reaction is preferably carried out in dry nitrogen, helium, and/or argon.

The molten thermoplastic polymer and the epoxy branching agent must be in contact for a sufficient period of time for chemical reaction to take place. Reaction progress may be monitored in various ways. For example, when polyesters or polymers containing carboxylic acid functional groups are reacted with the epoxy branching agent, the progress of the reaction may be monitored by observing the decrease in carboxylic acid end groups (CEG) with time. When no further decrease in CEG takes place, reaction has ceased.

Reaction rate, of course, is a function of temperature, but in the present invention a reaction time of generally from about 45 to about 150, typically from about 60 to about 130, preferably from about 90 to about 120 seconds (melt screw extruder) may be employed. Because mixing does not take place to as great a degree in a plastograph as in a melt screw extruder, reaction times in a plastograph are generally somewhat longer.

The process of the present invention may be carried out in a batch, semi-continuous, or continuous manner, as desired.

It should be noted that in the process of the present invention, a chemical reaction is actually occuring between the thermoplastic polymer and the epoxy branching agent. This reaction is evidenced by an increase in melt strength as well as an increase in the intrinsic viscosity (I.V.). When polyesters or compounds containing carboxylic acid functional groups are reacted with the epoxy branching agents, the chemical reaction is also evidenced by a concomitant decrease in CEG level.

The increase in melt strength and concomitant increase in I.V. result from chain branching of the thermoplastic polymer, which chain branching occurs when the polymer and epoxy branching agent are reacted in the presence of a catalyst as described hereinabove.

As indicated hereinabove, the present process provides thermoplastic polymers having increased melt strength. These increased melt strength thermoplastic polymers are useful for extrusion applications. Such applications include pipe, film, and blow molding uses such as in blow molding bottles.

Melt strength may be measured by extruding a six-inch strand of thermoplastic polymer through a constant drive index apparatus at a temperature high enough to keep the polymer molten (generally about 235° C). melt strength (MS) may be defined as follows:

$$MS = \frac{T_1}{T_2}$$

wherein the time required to extrude a polymer strand three inches ($T_1$) from the base of the melt index barrel is determined and without interruption the time required to extrude the same polymer to six inches is determined. The difference between the total time at six inches and the time at three inches is computed to give $T_2$.

A melt strength value of from about 1.0 to about 2.6 is desirable when the material is to be used in extrusion applications. Ideally, a value of 1.0 is desired since this would mean that the second three-inch segment extruded at the same rate as the first segment.

For polymers with poor or low melt strengths, the second segment is extruded much more rapidly than the first segment, resulting in a $T_1/T_2$ ratio significantly greater than 1.0.

Thus, polymers having poor or very low melt strengths have rather large values of $T_1/T_2$. By saying that certain polymers have "no melt strength" is meant that the second segment of the six-inch strand is extruded so rapidly that $T_2$ cannot be measured.

The term "high melt strength polymers" refers to polymers having a ratio of $T_1/T_2$ approaching the ideal value of 1.0, and the terms "poor" or "low melt strength polymers" refer to polymers having comparatively large $T_1/T_2$ ratios. Polymers having "no melt strength" have so small a $T_2$ value that the melt strength cannot be measured.

The melt strength of a polymer depends upon the particular polymer employed as well as the temperature. However, the improved melt strength polymers of the present invention have melt strengths of generally less than about 2.6, typically less than about 2.4, and preferably less than about 2.3 at 235° C.

The improved melt strength polymers of the present invention also have improved die swell characteristics. Die swell may be described as the increase in diameter which takes place when the molten polymer is released from an extrusion die. As the polymer moves through the die, the entanglements and branches of the polymer chains are deformed or displaced from their equilibrium positions. This represents a storage of elastic energy. As the polymer is released from the die, this energy is regained by a return of the entanglements and branches to their equilibrium positions. This results in die swell.

The diameter of the improved melt strength polymers of the present invention may increase up to about two or three times the diameter of the extrusion orifice. Die swell is important for blow molding applications since (a) the larger the diameter of the extruded polymer, the easier it is for air to be blown into the melt, and (b) the greater the die swell, the greater the expansion of the polymer to fit the particular mold.

The improved melt strength polymers of the present invention also have increased intrinsic viscosities. The "intrinsic viscosity" of the polymers of the present invention may be conveniently determined by the equation $$I.V. = \lim_{c \to o} \ln \frac{N_r}{c}$$

wherein $N_r$ is the "relative viscosity" obtained by dividing the viscosity of a dilute solution of the polymer by the viscosity of the solvent employed (measured at the same temperature), and $c$ is the polymer concentration in the solution, expressed in grams per 100 milliliters. The intrinsic viscosity of the improved polymers of the present invention in o-chlorophenol at 25° C is generally from about 0.9 to about 1.7, typically from about 1.0 to about 1.65 and preferably from about 1.1 to about 1.6 poise.

As indicated hereinabove, when polyesters or polymers containing carboxylic acid functional groups are reacted with the epoxy branching agents, the extent of reaction may be determined by measuring the change in the number of microequivalents of carboxylic acid end groups per gram of polymer. By "carboxylic acid end groups" is meant the number of carboxylic acid end groups present in the polymer, measured in microequivalents per gram of polymer. The number of carboxylic acid end groups may be measured by dissolving the polymer in a 70/30 mixture of o-cresol/chloroform solvent and potentiometrically titrating the solution with tetrabutylammonium hydroxide. When polyesters of polymers containing carboxylic acid end functional groups are reacted with the epoxy branching agent, these improved melt strength polymers may contain generally less than about 30, typically less than about 25, and preferably less than about 20 microequivalents of carboxylic acid end groups per gram of polymer.

The improved melt strength polymers of the present invention have improved color characteristics over those polymers which are formed by the reaction of a molten thermoplastic polymer and an epoxy branching agent in the presence of, for example, a typical amine catalyst such as diethylamine. For example, the reaction product of a polyester, diepoxide, and n-butyl triphenyl phosphonium halide is a plastograph under a nitrogen blanket is substantially white (greyish white solids formed in melt screw extruder) whereas the color of the reaction products resulting from using an Epicure catalyst (Epicure is a trademark for curing agents for epoxy resins) range from yellow or tan (Epicure 826) to a deep yellow material (Epicure 842) as observed with the naked eye.

The improved melt strength polymers of the present invention are also less brittle than those formed by the reaction of a molten thermoplastic polymer and an epoxy branching agent in the presence of amine type catalysts.

By "less brittle" is meant that the improved melt strength polymers of the present invention have impact strengths which correspond to those of unmodified polymers and have impact strengths which are substantially better than the impact strength of polymers prepared from other amine catalysts in the Izod, notched Izod, and/or reversed Izod tests. Generally, the higher the notched and reversed notched Izods, the less the brittleness and the greater the "toughness" of the particular polymer.

The present invention is further illustrated by the following examples. All parts and percentages in the examples as well as in the specification and claims are by weight unless otherwise specified.

EXAMPLE I

This example illustrates the preparation of a highly branched, increased melt strength saturated thermoplastic polyester useful in blow molding and having improved color characteristics and mechanical properties.

Forty-nine and one-half grams (99 weight percent) of polybutylene terephthalate having 70 microequivalents of carboxylic acid end groups per gram of polybutylene terephthalate are added to a C. W. Brabender Rolle type plastograph. The polybutylene terephthalate is then heated to a temperature of 250° C at substantially atmospheric pressure such that only molten polybutylene terephthalate is present. At this time, 0.5 grams (1 weight percent) of the diglycidyl ether of bisphenol A and 0.011 grams (~0.02 weight percent) of n-butyl triphenyl phosphonium bromide are mixed. After 4 minutes, the molten polybutylene terephthalate is removed from the plastograph and cooled to room temperature.

The properties of both the unmodified and modified polybutylene terephthalate are summarized in Table I as follows:

Table I

| Property | Unmodified PBT | Modified PBT |
|---|---|---|
| CEG (microequivalents/gram) | 70 | 8 |
| Melt Strength at 235° C | >3.5 | 1.3 |
| I.V. | 0.75 | 1.52 |
| Color (visual) | white | white |
| Reaction Time (secs.) | — | 240 |

It is apparent from Table I that the modified polybutylene terephthalate has a significantly greater melt strength than that of unmodified polybutylene terephthalate.

EXAMPLE II

Two hundredths gram of allyl triphenyl phosphonium bromide are substituted for the 0.02 grams of n-butyl triphenyl phosphonium bromide of Example I under the same reaction conditions and similar results are achieved.

EXAMPLE III

Twelve and six tenths gram of Epi-Rez 510 (1.1% by weight), 1,087.4 grams of polybutylene terephthalate (98.9% by weight), and 0.26 grams of n-butyl triphenyl phosphonium bromide are blended in a Werner-Pfleiderer ZSK twin screw extruder with kneading blocks at a temperature of 254° C for a period of two minutes. The unmodified polybutylene terephthalate has an intrinsic viscosity of 0.75, a melt strength of more than 3.5, and 70 microequivalents of CEG/gram PBT. The product is quenched in a water bath at ambient temperature.

The product has an intrinsic viscosity of 1.1, a melt strength of 2.2 and about 18 microequivalents of CEG/gram PBT.

This material is then injection molded under the following conditions:

Barrel Temperature; 238° C
Mold Temperature; 57° C
Cycle; 22 secs.
RPM; 85
Pressure; 9500 psi The mechanical properties of the melt strength improved polybutylene terephthalate are indicated in Table II below:

Table II

| Property | Improved PBT |
|---|---|
| Tensile (max), psi | 8020 |
| Elongation (max), % | >50 |
| Tensile Mod, psi | $3.99 \times 10^5$ |
| Flex Strength, psi at 5% strain | 12,460 |
| Flex Modulus, psi | $3.67 \times 10^5$ |
| Notched Izod (ft. lbs/in of notch) | 0.82 |
| Reversed Notch Izod (ft. lbs/in of notch) | 28.9 |
| Un-notched Izod (ft. lbs/in) | NB* |
| HDT ° C, 264 psi | 53–55 |
| Rockwell Hardness (m scale) | — |

*No Break

COMPARATIVE EXAMPLE

A sample of 1,000 grams of unmodified 1.0 I.V. PBT is injection molded under the same conditions as in Example III above. The mechanical properties of this unmodified 1.0 I.V. PBT are indicated in Table III below:

Table III

| Property | Improved PBT |
|---|---|
| Tensile (max), psi | 7783 |
| Elongation (max), % | >50 |
| Tensile Mod, psi | $3.74 \times 10^5$ |
| Flex Strength, psi at 5% strain | 12,040 |
| Flex Modulus, psi | $3.57 \times 10^5$ |
| Notched Izod (ft. lbs/in of notch) | 0.93 |
| Reversed Notch Izod (ft. lbs/in of notch) | 1.31 |
| Un-notched Izod (ft. lbs/in) | NB* |
| HDT ° C, 264 psi | 52–53 |
| Rockwell Hardness (m scale) | 75 |

*No Break

A comparison of Tables II and III indicates that the mechanical properties of 0.75 IV PBT modified in accordance with the process of the present invention are similar to those of 1.0 IV PBT. Thus, high IV (1.1) PBT may be facilely prepared from lower IV (0.75) PBT in two minutes. The modified PBT product has minimal coloration, reduced CEG, improved melt strength, and similar mechanical properties to 1.0 IV PBT.

The principles, preferred embodiments, and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

I claim:

1. A process for preparing branched chain polybutylene terephthalate having increased melt strength and useful in extrusion applications, which process comprises reacting polybutylene terephthalate in the molten state with at least one epoxy branching agent containing at least two epoxy groups per molecule of epoxy branching agent, in the presence of a catalytic amount of at least one catalyst selected from the group consisting of alkyl triphenyl phosphonium halide and alkenyl triphenyl phosphonium halide wherein the alkyl groups contain from 1 to 10 carbon atoms, the alkenyl groups contain from 2 to 6 carbon atoms, and the halide anion is selected from the group consisting of chloride and bromide, to produce said branched chain polybutylene terephthalate having increased melt strength.

2. The process of claim 1 wherein said epoxy branching agent contains halogen substitution, and said catalyst is n-butyl triphenyl phosphonium bromide.

3. The process of claim 1 wherein said reaction is carried out at a temperature of from about 150° to about 350° C and at substantially atmospheric pressure.

4. The process of claim 1 wherein said polybutylene terephthalate and said epoxy branching agent are reacted in the presence of said catalyst by (a) forming a mixture by blending from about 97.5 to about 99.5% by weight of thermoplastic polymer, from about 0.5 to about 2.5% by weight of epoxy branching agent, and from about 0.01 to about 0.1% by weight of catalyst, and (b) feeding this mixture into an extruder which is maintained at a temperature above the melting point of the polymer so that chemical reaction between the polymer and the epoxy branching agent takes place.

5. A process for preparing branched chain thermoplastic polybutylene terephthalate having increased melt strength useful in extrusion applications, which process comprises reacting polybutylene terephthalate in the molten state, with at least one epoxy branching agent containing at least two epoxy groups per molecule of epoxy branching agent, in the presence of a catalytic amount of at least one catalyst selected from the group consisting of n-butyl triphenyl phosphonium bromide and allyl triphenyl phosphonium bromide to produce said branched chain thermoplastic polybutylene terephthalate having increased melt strength.

6. The process of claim 5 wherein there is reacted from about 98 to about 99% by weight polybutylene terephthalate with from about 1 to about 2% by weight epoxy branching agent in the presence of from about 0.02 to about 0.06% by weight catalyst at a temperature of from about 180° to about 300° C, and at substantially atmospheric pressure.

7. The process of claim 6 wherein said catalyst is n-butyl triphenyl phosphonium bromide and said epoxy branching agent is the diglycidyl ether of p,p'-isopropylidenediphenol.

8. A process for preparing branched chain thermoplastic polybutylene terephthalate having increased melt strength useful in extrusion applications which process comprises reacting from about 98 to about 99% by weight of polybutylene terephthalate in the molten state, with from about 1 to about 2% by weight of at least one epoxy branching agent containing at least two epoxy groups per molecule of epoxy branching agent, in the presence of from about 0.02 to about 0.06% by weight of at least one catalyst selected from the group consisting of n-butyl triphenyl phosphonium bromide and allyl triphenyl phosphonium bromide wherein said reaction is carried out at a temperature of from about 220° to about 280° C and at substantially atmospheric pressure to produce said branched chain polybutylene terephthalate of increased melt strength.

9. A branched chain, improved melt strength polybutylene terephthalate suitable for extrusion applications and having improved color and mechanical properties and a melt strength ratio of $T_1/T_2$ of less than about 2.6 at 235° C wherein said branched chain polybutylene terephthalate comprises the reaction product of from about 97.5 to about 99.5% by weight of polybutylene terephthalate with from about 0.5 to about 2.5% by weight of at least one epoxy branching agent containing at least two epoxy groups per molecule of epoxy branching agent in the presence of at least one catalyst selected from the group consisting of alkyl triphenyl phosphonium halide and alkenyl triphenyl phosphonium halide wherein the alkyl groups contain from one to ten carbon atoms, the alkenyl groups contain from two to six carbon atoms, and the halide anion is selected from the group consisting of chloride and bromide.

10. The branched chain, theremoplastic polybutylene terephthalate composition of claim 9 wherein said branched chain, thermoplastic polybutylene terephthalate is the reaction product of said polybutylene terephthalate with said epoxy branching agent in the presence of from about 0.01 to about 0.1% by weight catalyst, said epoxy branching agent contains halogen substitution, and said branched chain, thermoplastic polybutylene terephthalate has a melt strength ratio of $T_1/T_2$ of less than about 2.4 at 235° C.

11. A branched chain, improved melt strength thermoplastic polybutylene terephthalate suitable for extrusion applications and having improved color and mechanical properties and a melt strength ratio of $T_1/T_2$ of less than about 2.3 at 235° C wherein said branched chain thermoplastic polybutylene terephthalate comprises the reaction product of from about 98 to about 99% by weight of polybutylene terephthalate, and from about 1 to about 2% by weight of at least one epoxy branching agent containing at least two epoxy groups per molecule of epoxy branching agent in the presence of from about 0.02 to about 0.06% by weight of a catalyst selected from the group consisting of n-butyl triphenyl phosphonium bromide and allyl triphenyl phosphonium bromide, wherein said branching agent is diglycidyl ether of p,p'-isopropylidenediphenol.

12. An improved molding process which comprises forming the molten polybutylene terephthalate of claim 9 into a desired article and cooling the molten polybutylene terephthalate.

13. A branched chain, improved melt strength polybutylene terephthalate suitable for extrusion applications and having improved color and mechanical properties and a melt strength ratio of $T_1/T_2$ of less than about 2.6 at 235° C wherein said branched chain polybutylene terephthalate comprises the reaction product from about 1 to about 2% by weight of polybutylene terephthalate and from about 98 to about 99% by weight of epoxy groups per molecule of epoxy branching agent in the presence of at least one catalyst selected from the group consisting of alkyl triphenyl phosphonium halide and alkenyl triphenyl phosphonium halide wherein the alkyl groups contain from 1 to 10 carbon atoms, the alkenyl groups contain from 2 to 6 carbon atoms, and the halide anion is selected from the group consisting of chloride and bromide.

* * * * *